March 13, 1951 B. T. RITCHIE 2,545,308
EGG COOKER
Filed June 27, 1947 2 Sheets-Sheet 2
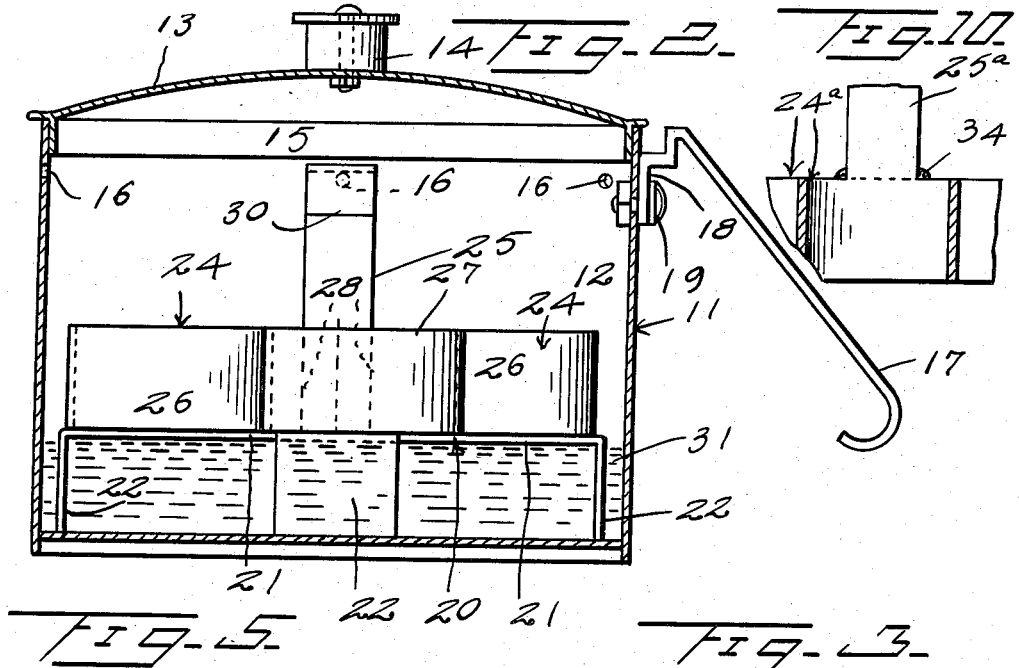
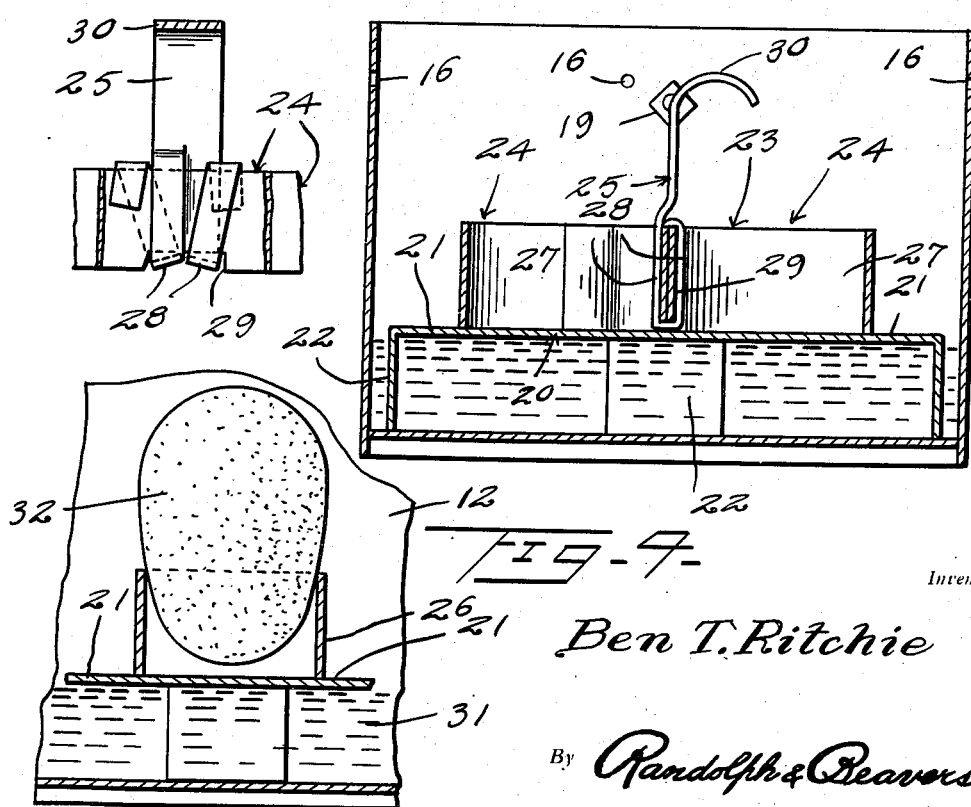
Inventor
Ben T. Ritchie
By Randolph & Beavers
Attorneys Patented Mar. 13, 1951

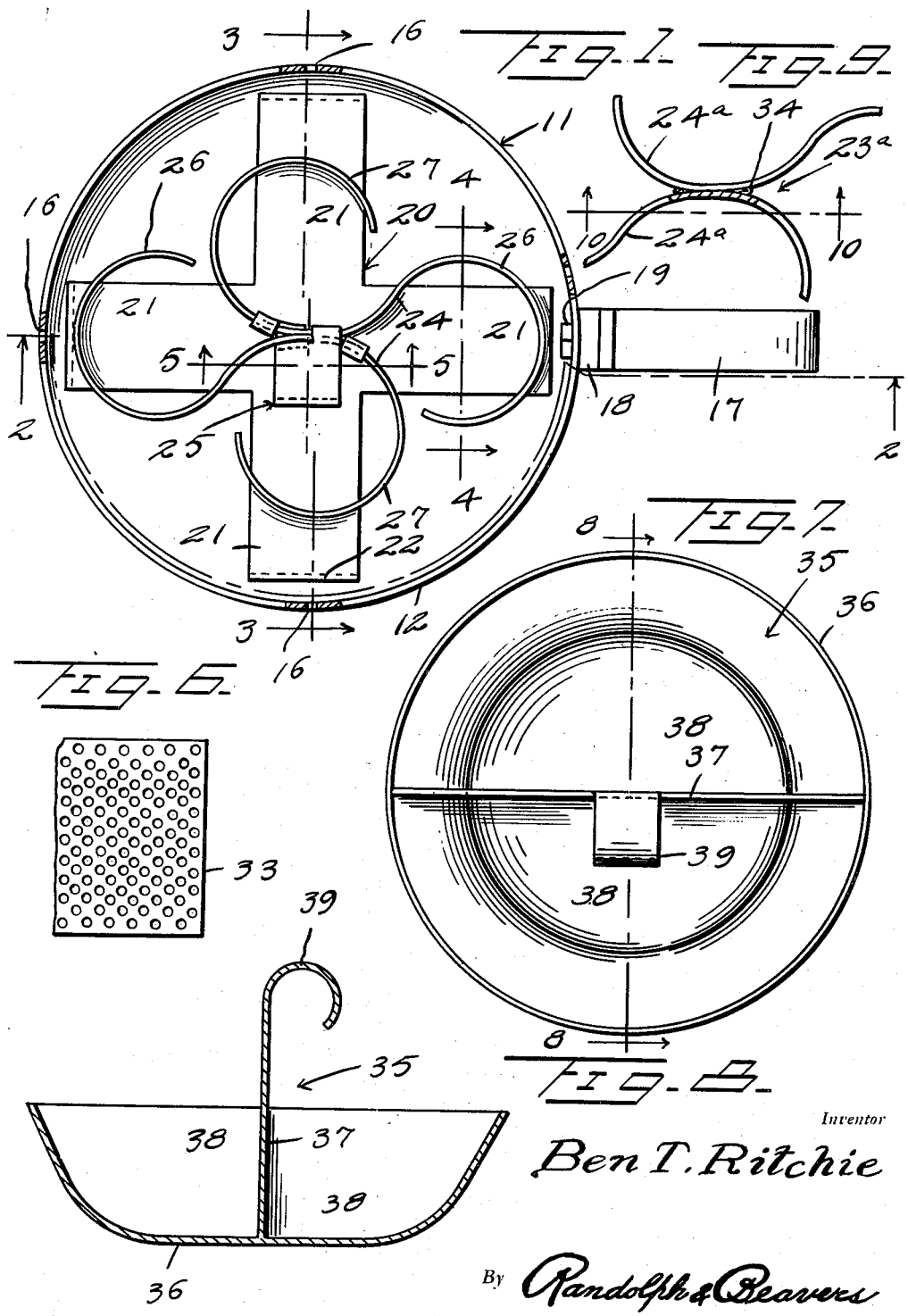

2,545,308

UNITED STATES PATENT OFFICE 2,545,308

EGG COOKER

Ben T. Ritchie, Salt Lake City, Utah

Application June 27, 1947, Serial No. 757,365

4 Claims. (Cl. 99—440)

This invention relates to a novel cooking vessel and egg holder for use in stream cooking eggs, soft or hard or poaching eggs, and has for its primary object to provide an egg cooker by the use of which eggs may be accurately timed while being steamed cooked for correctly soft or hard cooking or poaching eggs.

Another object of the invention is to provide an egg cooker by the use of which eggs are maintained out of contact with the water utilized in the cooking so as to prevent the cracking or breaking of the eggs.

Still another object of the invention is to provide an egg cooker including a readily demountable egg holder which may be applied to the cooking vessel after the water therein has been heated to a predetermined extent, for example 212 degrees Fahrenheit, so that the length of time required for cooking the eggs can be thereby accurately determined, without danger of cracking or breaking the eggs, and which egg holder may be readily removed from the cooking vessel and utilized for holding the eggs until they are served.

Still a further object of the invention is to provide a cooker of the character described including a plurality of removable elements utilized in conjunction with the cooking vessel and which is so constructed and arranged that each of said elements may be conveniently nested in the vessel for storage therewith.

Various other objects and advantages of the invention will hereinafter become more fully apparent from the following description of the drawings, illustrating preferred embodiments thereof, and wherein—

Figure 1 is a top plan view, partially in horizontal section, showing the cooker assembled for use in hard or soft steaming eggs and with the vessel lid or cover removed;

Figure 2 is a sectional view thereof taken substantially along a plane as indicated by the line 2—2 of Figure 1, and showing the lid applied;

Figure 3 is a transverse sectional view taken substantially along a plane as indicated by the line 3—3 of Figure 1;

Figure 4 is a transverse sectional view taken substantially along a plane as indicated by the line 4—4 of Figure 1 and showing an egg supported in a position for hard or soft steam cooking;

Figure 5 is a longitudinal sectional view taken substantially along a plane as indicated by the line 5—5 of Figure 1;

Figure 6 is a fragmentary plan view showing a slight modification of the invention as illustrated in Figures 1 to 5;

Figure 7 is a plan view of another form of egg holder for use with the invention for poaching eggs;

Figure 8 is a diametrical sectional view taken substantially along a plane as indicated by the line 8—8 of Figure 7;

Figure 9 is a fragmentary plan view, partly in horizontal section of a slightly modified form of the egg holder shown in Figure 1, and Figure 10 is a vertical sectional view thereof, taken substantially along a plane as indicated by the line 10—10 of Figure 9.

Referring more specifically to the drawings, and first with reference to Figures 1 to 5, the cooker in its entirety is designated generally 11 and includes a cooking vessel or container 12 which is preferably provided with a cylindrical side wall and a substantially flat bottom. The container 12 is open at its top and said open top is preferably closed by a lid 13 which is preferably externally convex and which is provided with a knob or handle 14. The lid 13 is provided with a depending flange 15 which is set inwardly from the periphery thereof and which is adapted to fit into the open upper end of the container 12. The side wall of the vessel 12, below and adjacent the bottom edge of the flange 15, when said lid 13 is applied, is provided with a series of steam vent openings or outlets 16.

A handle 17 is provided with an offset shank portion 18 which is adapted to be secured by a suitable fastening 19 to a portion of the side wall of the container 12 and adjacent the top thereof, but at a level so that the fastening 19 will not interfere with the movement of the flange 15 into engagement with the container. The handle or grip portion 17 is disposed at substantially an acute angle to the shank portion 18, so as to extend outwardly and downwardly with respect to the container 12.

The cooker 11 includes a rack 20 which, in the embodiment of the invention as illustrated and as best seen in Figure 1, is in the form of a cross, the terminal portion of each arm 21 of which is turned downwardly to form a supporting leg 22. The rack 20 is of a size to fit removably in the container 12 and with the legs 22 thereof resting on the container bottom, when said rack is in an operative position, as illustrated in the drawings.

The cooker 11 also includes an egg holder, designated generally 23, which includes two substantially S-shaped sections 24 which are connected together at a point adjacent, but not exactly intermediate of their ends, by a handle 25, so that the egg holder 23 will be of greater length in one direction than in the other direction, and so that corresponding ends or individual egg receiving portions 26 and 27 of the two sections 24 will be disposed substantially in alignment. The egg receiving portions 26 and 27, each generally define approximately three-quarters of a circle and each include a terminal or end of the section 24 of which it forms a part. The sections 24 may be formed of any suitable material which is relatively resilient, for a purpose which will hereinafter become apparent. As best seen in Figures 3 and 5, the handle 25 includes a shank, the lower portion of which is longitudinally split to form two corresponding strap portions 28 which are bent so as to be offset relatively to one another for extending down on opposite sides of portions of the sections 24, engaged by the handle 25. The bottom edges of the holder section portions, engaged by the handle 25, are provided with notches 29, as seen in Figure 5, and said strap portions 28 are bent to extend in opposite directions through the aligned notches 29 and are thereafter bent upwardly and extended upwardly to above the upper edges of the holder sections 24. The terminals of the straps 28 are turned inwardly and downwardly between the sections 24 to complete a secure connection of the handle 25 to said sections. As clearly indicated in Figures 2, 3 and 5, the unslit portion of the shank 25 extends upwardly from the sections 24 and terminates in a curved upper end forming a hook-shaped handle 30.

The length of the egg holder 23 is no greater than the diameter of the rack 20 and is adapted to be supported thereon with one of the egg receiving portions 26 and 27, resting on each arm 21 thereof.

For utilizing the cooker 11 for hard or soft steaming eggs, the rack 20 is applied as shown in Figures 1 to 3 and the bottom portion of the container 12 is filled with water, as indicated at 31, to the level of the tops of the legs 22, so that the arms 21 of the rack 20 will be disposed just above the level of the water. The vessel 12 may be placed over any suitable source of heat, such as a gas or electric burner, a coal or wood stove, a camp fire or canned head for heating the water 31 to a boiling temperature or approximately 212 degrees Fahrenheit. An egg 32, one of which is shown in Figure 4, is then placed in each of the egg holder elements 26 and 27 and with the smaller end of the egg extending downwardly into the holder element 26 or 27 and by means of which the egg will be supported in substantially an upright position and above the level of the water 31. The resiliency of the egg holder elements 26 and 27 will permit them to yield to engage eggs of different sizes and will also cause a limited gripping engagement of the eggs for effectively retaining the eggs therein. After the water has been heated to a boiling point, as previously described, the egg holder 23, containing the eggs 32, is lowered into the container 12 and rested on the rack 20, as previously described, and the lid 13 is then applied.

For soft steam cooking eggs of normal size and which were at room temperature when applied to the cooker 11, approximately three and one-half minutes is required whereas to soft steam cook eggs at refrigerator temperature requires approximately four and one-half minutes. The time of soft steam cooking eggs of course varying, depending upon the size of the eggs. It will be readily apparent that since the eggs are not actually submerged in the water 31, that the danger of breaking the eggs is substantially eliminated, thus enabling the eggs to be applied to the cooker when the latter is at a boiling or cooking temperature without danger of breaking the eggs and thus enabling accurate soft or hard steaming of the eggs by timing the cooking operation.

Obviously, the holder 23 may be utilized for soft or hard steaming fewer than four eggs, and if desired, one of the sections 24 thereof may be omitted and a holder provided for soft steaming only two eggs, or by providing one or two additional sections 24, assuming a larger rack and vessel, the holder may be constructed for simultaneously soft or hard steaming six or eight eggs, respectively.

If desired, the rack 20 and holder 23 may be formed of perforated material, as indicated at 33 in Figure 6, instead of being formed of solid material, as illustrated in Figures 1 to 5, or other material such as mesh or open work material may be utilized for both the rack and holder.

Figures 9 and 10 illustrate a slightly modified form of holder designated generally 23a and including the holder sections 24a which are secured together by welding, as seen at 34 and at a point corresponding to the point of connection of the holder sections 24 by the straps 28. Obviously, the notch portions 29 can be omitted, and the handle 25a includes a shank which is not split to provide the straps 28, but the lower end of which is secured to the welded portions of the sections 24a by the weld 34.

Figures 7 and 8 illustrate a holder for use in lieu of the holder 23 or 23a for poaching eggs, and which is designated generally 35. The egg poacher 35 includes a relatively deep dish-shaped container 36 which is centrally divided by a partition 37 into corresponding compartments 38, each of which is adapted to contain an egg for poaching. The poacher 35 is provided with a handle 39 which corresponds substantially to the upper portion of the handle 25, and the lower shank end of which may be secured in any suitable manner to the upper edge of the partition 37 and intermediate of its ends or may be formed integral therewith. The poacher 35 is utilized in lieu of the holder 23 or 23a and with an egg to be poached, not shown, contained in one or both of the container compartments 38, and assuming the water 31 to be at a boiling temperature and at the level as seen in Figure 2, the poacher 35 is lowered into the vessel 12 and rested on the central portion of the rack 20 for steam poaching the eggs for the desired length of time.

The holders 23, 23a or 35 are adapted to be removed from the vessel 12 after first removing the lid 13 and after they have been left in the vessel for the required time to cook the eggs supported thereby, and said holders may then be utilized for supporting the eggs while cooling and for serving the eggs.

Various other modifications and changes are likewise contemplated and may obviously be resorted to, without departing from the spirit or scope of the invention as hereinafter defined by the appended claims.

I claim as my invention:

1. An egg cooker comprising, in combination with a cooking vessel having a substantially flat bottom, a rack removably disposed in the vessel and having depending supporting legs adapted to rest on said bottom, said vessel being adapted to be filled with water to approximately the level of the upper ends of said legs, and an egg holder, for supporting a plurality of eggs for steaming, demountably supported on the top of said rack and above the water level and having an upstanding handle by which said egg holder can be applied to or removed from the vessel while the water therein is in a heated condition, said egg holder comprising a relatively wide S-shaped strip of a resilient material having yieldably expansible end portions each adapted to yieldably support an egg in an upright position, one longitudinal edge of said strip engaging the top of the rack to support the egg holder thereon.

2. An egg cooker comprising, in combination with a cooking vessel having a substantially flat bottom, a rack removably disposed in the vessel and having depending supporting legs adapted to rest on said bottom, said vessel being adapted to be filled with water to approximately the level of the upper ends of said legs, and an egg holder, for supporting a plurality of eggs for steaming, demountably supported on the top of said rack and above the water level and having an upstanding handle by which said egg holder can be applied to or removed from the vessel while the water therein is in a heated condition, said egg holder comprising a plurality of relatively wide substantially S-shaped strips of a resilient material connected together in off center relationship, the egg holder handle rising from the connected portions of said strips, and each of the ends of said strips being adapted to engage and support an egg in substantially an upright position, complementary longitudinal edges of the strips engaging on the rack top to support the egg holder thereon.

3. An egg cooker comprising, in combination with a cooking vessel having a substantially flat bottom, a rack removably disposed in the vessel and having depending supporting legs adapted to rest on said bottom, said vessel being adapted to be filled with water to approximately the level of the upper ends of said legs, and an egg holder, for supporting a plurality of eggs for steaming, demountably supported on the top of said rack and above the water level and having an upstanding handle by which said egg holder can be applied to or removed from the vessel while the water therein is in a heated condition, said egg holder comprising a plurality of relatively wide substantially S-shaped strips of a resilient material connected together in off center relationship, the egg holder handle rising from the connected portions of said strips, and each of the ends of said strips being adapted to engage and support an egg in substantially an upright position, complementary longitudinal edges of the strips engaging on the rack top to support the egg holder thereon, said handle having a split shank portion engaging around and connecting said strips.

4. An egg holding rack comprising a cross-shaped base having arms provided with integral depending supporting legs adapted to rest on the bottom of a cooking vessel containing water for supporting the base above the water level in the vessel, a rack portion disposed above and supported by said base including a plurality of relatively wide S-shaped strips having end portions each forming an egg holding section each having an open bottom and an open top, said sections each being shaped to engage around a substantial portion of an egg to support it in an upright position therein and being resiliently expansible for yieldably gripping the egg, each egg holding section resting on one of said arms, said strips having complementary abutting portions, and a handle secured to said abutting portions of the strips and rising therefrom and connecting the strips together in off-center relationship.

BEN T. RITCHIE.

REFERENCES CITED

The following references are of record in the file of this patent:

UNITED STATES PATENTS

| Number | Name | Date |
|---|---|---|
| 49,062 | Ashley | Aug. 1, 1865 |
| 886,954 | Csincsak | May 5, 1908 |
| 1,213,148 | Blake | Jan. 23, 1917 |
| 1,517,432 | Kayte | Dec. 2, 1924 |
| 1,599,321 | Devlin | Sept. 7, 1926 |
| 1,850,131 | Mennicke | Mar. 22, 1932 |
| 2,040,649 | Fortes | May 12, 1936 |
| 2,226,844 | Carr | Dec. 31, 1940 |
| 2,382,222 | Havas | Aug. 14, 1945 |

FOREIGN PATENTS

| Number | Country | Date |
|---|---|---|
| 7,904 | Great Britain | Feb. 23, 1895 |
| 18,494 | Great Britain | Oct. 3, 1893 |
| 336,059 | Great Britain | Oct. 9, 1930 |